G. W. AND C. E. GOSS.
FARM GATE.
APPLICATION FILED FEB. 18, 1918.

1,343,559.

Patented June 15, 1920.

Witness
A. Lunsdell

Inventor
George W. Goss
Charles E. Goss

By
C. C. Shepherd Attorney

UNITED STATES PATENT OFFICE.

GEORGE W. GOSS AND CHARLES E. GOSS, OF BALTIMORE, OHIO.

FARM-GATE.

1,343,559.

Specification of Letters Patent. Patented June 15, 1920.

Application filed February 18, 1918. Serial No. 217,768.

*To all whom it may concern:*

Be it known that we, GEORGE W. Goss and CHARLES E. GOSS, citizens of the United States, residing at Baltimore, in the county of Fairfield and State of Ohio, have invented certain new and useful Improvements in Farm-Gates, of which the following is a specification.

This invention relates to farm gates, and has for its primary object to produce a gate wherein is embodied substantial and durable features of construction, lightness of weight and economy in manufacture.

The invention further provides a gate wherein is included a plurality of upright pickets, which are adapted to be arranged in pairs, and have pivotally situated therebetween a plurality of longitudinally extending bars, the faces of said pickets joining said bars being vertically grooved, so as to prevent the pickets from warping, to decrease the weight thereof, and to prevent the accumulation of moisture between said bars and pickets so as to avoid decay and consequent disintegration of the gate.

A further object of the invention resides in an improved picket for use in connection with farm gates and other similar structures, wherein the face thereof disposed for engagement with the longitudinally extending bars of the gate, is formed with a plurality of spaced, parallel grooves, providing moisture excluding passageways, and at the same time serving to decrease the weight of the gate without sacrificing its normal strength, and to provide bolt receiving openings in the body of the picket situated between said grooves, which are adapted to receive and incase the shanks of the bolts passing therethrough, and serving to pivotally connect the pickets with said bars, so that said bolts will not be subject to corrosion or undue strains.

With these and other objects in view, as will appear as the description proceeds, the invention accordingly consists in the novel features of construction, combination of elements, and arrangement of parts hereinafter fully described and having the scope thereof indicated in the claims hereunto appended.

In the drawing, forming part of the present specification, and in which similar characters of reference denote corresponding parts:—

Figure 1:
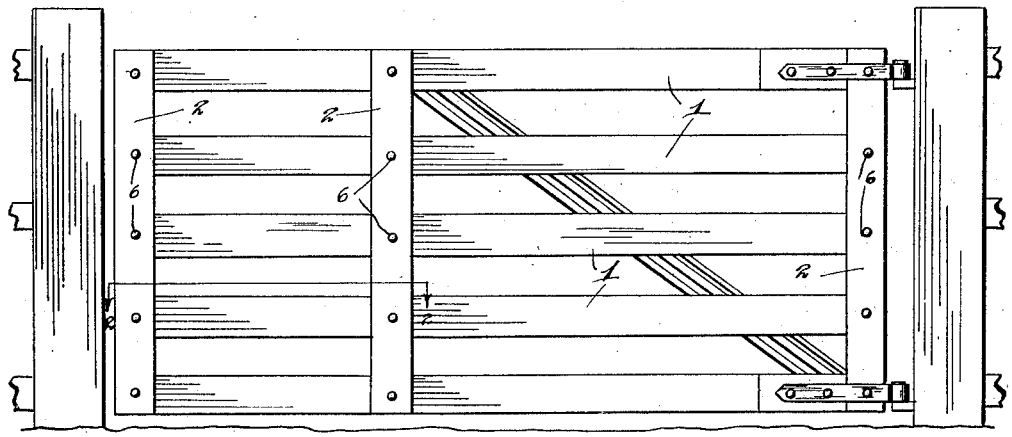
Figure 1 is a side elevation of a gate constructed in accordance with the principles of the invention.
Figure 2:
Fig. 2 is an enlarged horizontal sectional view taken along the line 2—2 of Fig. 1.
Figure 3:
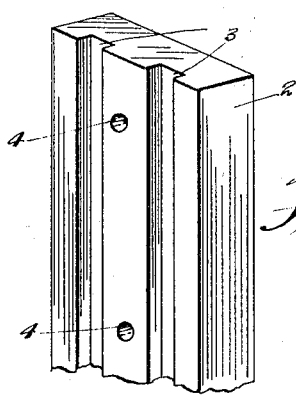
Fig. 3 is a detailed perspective view of one of the picket members of the gate and Fig. 4 is a detailed, vertical section showing a slightly modified form of the gate.

Referring more particularly to the drawing, the gate A comprising the present invention, is preferably of the type employed in connection with farm fences, and has the various parts thereof pivotally associated so that the height of the gate may be readily controlled. In this instance, the gate includes a plurality of longitudinally extending bars 1, located in parallel, spaced relation. The bars are connected by means of a plurality of vertically extending picket members 2, which latter are located at the extremities of, and intermediate the ends of, the bars 1.

As stated above, it is the object of the present invention to prevent the gate from warping and decaying, and also to decrease the weight thereof, and to this end the picket members are located in pairs and are situated on opposite sides of the bars 1. The faces of said members, disposed in engagement with said bars, are provided with a plurality of spaced, vertically extending, parallel grooves 3, which are adapted to serve as moisture excluding passageways. Hitherto the picket members have been of relatively solid construction and as a result moisture would accumulate between the engaging faces of said bars and members and in course of time would cause the latter elements to decay and disintegrate, however, it will be apparent that through the use of the grooves 3, such accumulation of moisture will be effectively prevented, and the adjoining faces of said bars and members will be maintained in a substantially dry condition.

In order to secure the bars and picket members, said bars are provided, at positions intermediate of the grooves 3, with a plurality of bolt receiving openings 4, which openings are adapted to register with similar openings 5 formed in the bars 1. Passing through said openings are a plurality of headed bolts 6, which are formed with threaded extremities for the reception of binding nuts 7. This construction permits the bars 1 to be pivotally connected with the picket members so that the gate may be raised and lowered in accordance with its principles of design. It will be noted that the shanks of the bolts are fully incased by said bars and picket members by lying within the openings 4 and 5 thereof and are not exposed to the atmosphere, this peculiar location of said bolts prevents the shanks thereof from being attacked by the weather.

Figure 4:

Through the construction above described, it will be seen that there is provided a gate wherein the element of decay and disintegration, hitherto prevalent in wooden gates of this type, has been eliminated, thereby prolonging the life of the gate and rendering the same far more durable. The grooves 3 also serve to reduce the weight of the gate and thus contribute toward permitting the latter to be readily controlled and operated. It will be obvious, as shown in Fig. 4, that the bars $1^a$ may be provided with grooves $2^a$ and that the pickets $3^a$ may then be made of solid construction. This formation of the gate is exactly the same in principle as that described in the preferred form and will of course fall within the ambit of the invention.

In the foregoing description we have used for purposes of description the term picket as applied to the members 2, but it will be understood of course that the same are in reality vertical cross bars, or vertical plank members and hence we do not wish to be limited to the specific meaning of the word picket, but that the latter term is applicable to all of the upright members which may be employed by the gate.

We claim:

1. In a gate, a plurality of longitudinally extending bar members having bolt receiving openings formed therein, picket members extending transversely of said bars, one set of said members being provided with a plurality of spaced grooves in the faces which contact with the faces of the other set of members, and bolts passing through said sets of members to hold them together and through the spaces between the spaced grooves to completely incase them.

2. In a gate, a plurality of longitudinally extending bars, a plurality of pickets arranged in pairs with said bars between the pickets forming each pair, the surfaces of said pickets contiguous with said bars being formed with a pair of spaced vertically extending grooves, and bolts passing through said bars and said pickets where they cross and through the spaces between the grooves of said pickets so that the shanks of the bolts are completely incased.

In testimony whereof we affix our signatures in presence of two witnesses.

GEORGE W. GOSS.
CHARLES E. GOSS.

Witnesses:
CARL H. WILSON,
LOTTIE I. SEEVER.